(12) United States Patent
Park et al.

(10) Patent No.: US 6,355,740 B1
(45) Date of Patent: Mar. 12, 2002

(54) SILICONE-MODIFIED EPOXY RESIN AND ITS PREPARING METHOD AND SILICONE-MODIFIED EPOXY RESIN COMPOSITION

(75) Inventors: Chong Soo Park, Seoul; Jin Seon Yu, Inchon; Deuk Sung Bac, Seoul, all of (KR)

(73) Assignee: Kukdo Chemical Co., Ltd., Seoul (KR)

( * ) Notice: Subject to any disclaimer, the term of this patent is extended or adjusted under 35 U.S.C. 154(b) by 0 days.

(21) Appl. No.: 09/503,509

(22) Filed: Feb. 14, 2000

(30) Foreign Application Priority Data

Aug. 2, 1999 (KR) .............................................. 99-31691
Aug. 6, 1999 (KR) .............................................. 99-32339

(51) Int. Cl.$^7$ ............................................... C08G 77/38
(52) U.S. Cl. .......................... 525/476; 528/29; 528/33; 556/458

(58) Field of Search .............................. 525/476; 528/29, 528/33; 556/458

(56) References Cited

U.S. PATENT DOCUMENTS 3,154,597 A * 10/1964 McWhorter

* cited by examiner

Primary Examiner—Robert Dawson
Assistant Examiner—Kuo-Liang Peng
(74) Attorney, Agent, or Firm—Browdy and Neimark

(57) ABSTRACT

The invention provides a silicone-modified epoxy resin obtained through condensation polymerization of a methoxy group silicone intermediate to a bisphenol-based epoxy resin, and its preparing method and a composition comprising the said silicone-modified epoxy resin. The silicone-modified epoxy resin is excellent in heat resistance and of value for use in coatings for hot appliances such as oven.

6 Claims, 2 Drawing Sheets

■ 1st Composition
● 2nd Composition
△ 3rd Composition
▼ 4th Composition
○ 5th Composition

- ■ 1st Composition
- ● 2nd Composition
- △ 3rd Composition
- ▼ 4th Composition
- ○ 5th Composition

SILICONE-MODIFIED EPOXY RESIN AND ITS PREPARING METHOD AND SILICONE-MODIFIED EPOXY RESIN COMPOSITION

BACKGROUND OF THE INVENTION

1. Field of the Invention

The present invention relates generally to an epoxy resin, and more particularly, to a silicone-modified epoxy resin with heat resistance enhanced through condensation polymerization of a methoxy group silicone intermediate to a bisphenol-A or bisphenol-F based epoxy resin, and its method of preparation as well as to a composition comprising the said silicone-modified epoxy resin.

2. Description of the Related Art

The structure of the following formula 1 represents a common bisphenol-A or bisphenol-F based epoxy resin.

[Formula 1]

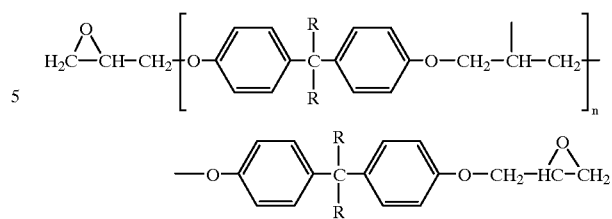

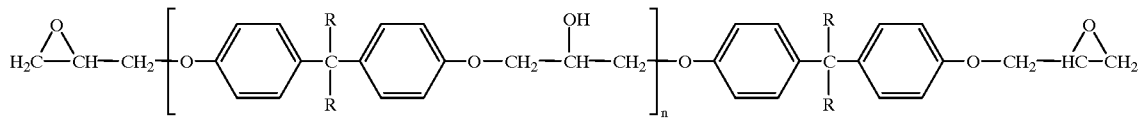

In formula 1, R is —$CH_3$ or H, whereupon R is $CH_3$ for a bisphenol-A based epoxy resin or H for a bisphenol-F based epoxy resin, and n is 1–10.

The bisphenol-A or bisphenol-F based epoxy resin having the formula 1 is of value for use in coatings, electric materials, civil engineering and construction materials and adhesives, in combination with various curing agents of polyamide resins, aromatic polyamines, aliphatic polyamines and anhydrides.

Such an epoxy resin is used for a powder coating composition but is inadequate for use as a coating resin for hot appliances such as ovens due to its poor heat resistance, i.e., it discolors at a high temperature of above 200° C.

SUMMARY OF THE INVENTION

It is, therefore, an object of the present invention to provide a bisphenol-A or bisphenol-F based epoxy resin with high heat resistance and its method of preparation as well as a composition comprising the epoxy resin.

To achieve the above object, there is provided a method for preparing a silicone-modified epoxy resin according to the present invention which is obtained through condensation polymerization of a methoxy group silicone intermediate to a bisphenol-A or bisphenol-F based epoxy resin.

The structure of the silicone-modified random copolymer epoxy resin according to the present invention is shown in the following formula 2.

[Formula 2]

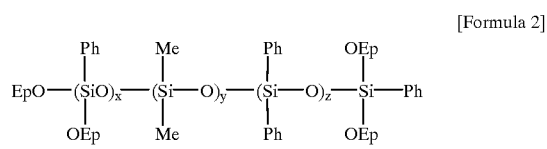

In formula 2, wherein x, y and z are more than 1, and Ep is and wherein n is 1–10.

When the weight ratio of the methoxy group silicone intermediate is 20(±1) wt. % based on the total weight of the reactants, the silicone-modified epoxy resin is obtained as an opaque and pale yellow mass having the equivalent weight of 1100 to 1300 g/eq and the fusion viscosity of 1000 to 5000 at 175° C.

A description will be made below as to a method for preparing the silicone-modified epoxy resin of the present invention.

First, a common bisphenol-A or bisphenol-F based epoxy resin is heated and melted at 50 to 150° C. To the epoxy resin is added 5–50% wt. % of a methoxy group silicone intermediate based on the total weight of the reactant and the mixture is slowly heated at 150° C. to 200° C. Samples are collected at time intervals of one hour from the time the temperature of the mixture reaches 150° C. At a desired fusion viscosity, the mixture is cooled below 150° C. to terminate the reaction.

To sum up, the method for preparing the silicone-modified epoxy resin of the present invention includes the steps of: heating and melting the epoxy resin; adding an appropriate amount of the methoxy group silicone intermediate to the melted epoxy resin; and heating the mixture to obtain the product of a desired fusion viscosity.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
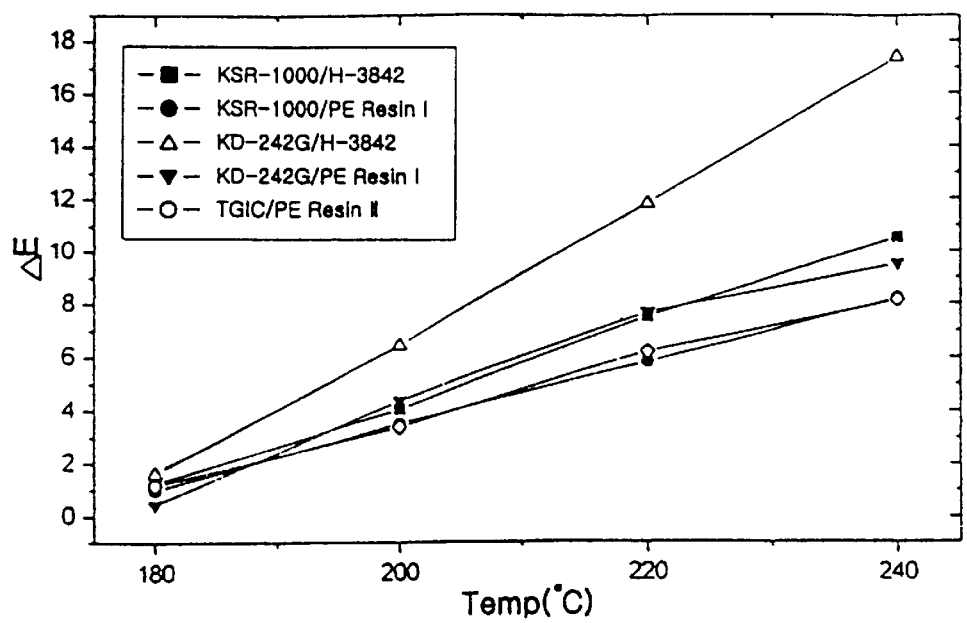
FIGS. 1 and 2 show the results of heat resistance tests for powder coating compositions of a silicone-modified epoxy resin according to the present invention.

A preferred embodiment of the present invention will be described below regarding a method for preparing a silicone-modified epoxy resin through condensation polymerization of a methoxy group silicone intermediate to a bisphenol-A epoxy resin.

700 kg of a bisphenol-A based epoxy resin (formula 1:R—$CH_3$) supplied by Kukdo Chemical Co., Ltd. is heated to fusion at 150° C. To the melted bisphenol-A based epoxy resin is added 300 kg of a methoxy group silicone intermediate having the formula 3. The mixture is heated at above 150° C. for 6–12 hours to give an additional amount of the product.

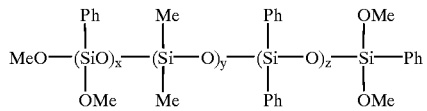

In formula 3, Ph is phenyl, Me is Methyl, and x, y and z are more than 1.

The methoxy group silicone intermediate used in the present invention has the specific gravity of 1.120–1.140, the viscosity of 50–100 cps (at 25° C.) and the methoxy content of 14.0–16.0 wt. %.

The following Reaction 1 shows a process for preparing the silicone-modified epoxy resin of the present invention.

Reaction 1

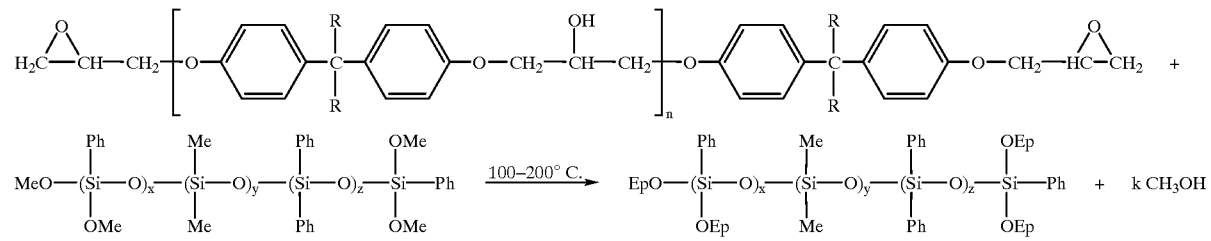

In reaction 1, k is x+3.

In reaction 1, k is x+3, x, y and z are more than 1, and n is 1–10.

Table 1 lists the powder coating compositions. Here, first and second compositions use the silicone-modified epoxy resin of the present invention.

TABLE 1

| Materials | A | B | C | D | E |
|---|---|---|---|---|---|
| | | | | | Unit: wt. % |
| KSR-1000 (Principal Component) | 57.45 | 34.75 | — | — | — |
| KD-242G (Principal Component) | — | — | 57.07 | 26.78 | — |
| TGIC (Principal Component) | — | — | — | — | 4.05 |
| PE-Resin I (Hardening Agent) | — | 23.16 | — | 31.13 | — |
| PE-Resin II (Hardening Agent) | — | — | — | — | 53.86 |
| H-3842 (Hardening Agent) | 0.89 | — | 1.55 | — | — |
| Benzoin | 0.72 | 0.72 | 0.71 | 0.72 | 0.72 |
| Leveling Agent | 0.72 | 0.72 | 0.71 | 0.72 | 0.72 |
| 2MI | — | 0.1 | — | 0.10 | 0.10 |
| BaSO$_4$ | 10.06 | 10.15 | 10.0 | 10.15 | 10.15 |
| TiO$_2$R900 | 30.16 | 30.4 | 29.96 | 30.40 | 30.40 |

TABLE 1-continued

| Materials | A | B | C | D | E |
|---|---|---|---|---|---|
| | | | | | Unit: wt. % |
| Total | 100 | 100 | 100 | 100 | 100 |

Note:
A - First Composition (Present Invention)
B - Second Composition (Present Invention)
C - Third Composition (First Comparative Example)
D - Fourth Composition (First Comparative Example)
E - Fifth Composition (First Comparative Example)
KSR-1000: Silicone-modified epoxy resin of the present invention obtained in the Embodiment
KD-242G: Bispheonol-A based epoxy resin
TGIC: Triglycidyl-isocyanurate
PE Resin I: Carboxylic polyester (Average acid value = 70 ± 5)
PE Resin II: Carboxylic polyester (Average acid value = 50 ± 3)
H-3842: Modified dicyanamide
Leveling Agent: Acryl resin-based leveling agent
2MI: 2-methyl-imidazol The first composition includes the silicone-modified epoxy resin (KSR-1000) of the present invention as a principal component and H-3842 as a hardening agent. The third composition includes a non-modified bisphenol-A based epoxy resin as a principal component and H-3842 as a hardening agent.

The second composition includes the silicone-modified epoxy resin (KSR-1000) of the present invention as a principal component and CC-314 as a hardening agent. The fourth composition includes a non-modified bisphenol-A based epoxy resin as a principal component and CC-314 as a hardening agent.

The fifth composition uses a polyester/TGIC-based resin other than the epoxy resin. Although the fifth composition is relatively excellent in heat resistance but has limited use due to the toxicity of TGIC. Tests for the TGIC compositions are carried out to compare the heat resistance of the compositions containing the silicone-modified epoxy resin of the present invention with that of the TGIC compositions.

Table 2 shows the general properties of the compositions listed in Table 1.

TABLE 2

| Items | A | B | C | D | E |
|---|---|---|---|---|---|
| Appearance | W/LY | W/LY | W/LY | W/LY | W/LY |
| Impact dilect* (kg · cm) | Good | Good | Good | Good | Good |
| Erichen** (mm) | Good | Good | Good | Good | Good |

TABLE 2-continued

| Items | A | B | C | D | E |
|---|---|---|---|---|---|

Note:
*ASTM D 2794
**ISO 1520
W/LY: White/Light Yellow

As shown in Table 2, the first to fifth compositions have no significant differences in their general properties.

Figure 2:
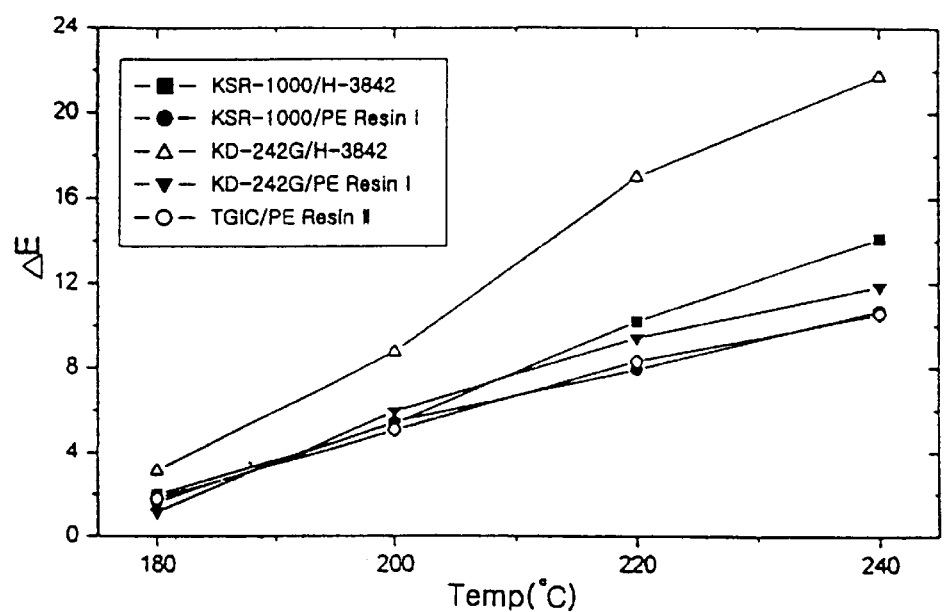

FIGS. 1 and 2 show the results of the heat resistance tests of the powder coating compositions comprising the silicone-modified epoxy resin of the present invention.

For carrying out the heat resistance tests, after heating at 180° C., 200° C., 220° C. and 240° C., the respective compositions are measured for the discoloration degree represented by ΔE as a measured value determined with a calorimeter. The results are shown in FIG. 1 (after one-hour heating) and FIG. 2 (after two-hour heating).

It is preferable that the composition has insignificant discoloration degree as represented by a low value of ΔE.

As shown in FIGS. 1 and 2, the first composition has a lower discoloration value ΔE than the third composition and the second composition has a lower discoloration value ΔE than the fourth composition. The fifth composition, which does not include the epoxy resin as a principal component, is excellent in heat resistance. The second composition using the silicone-modified epoxy resin of the present invention has almost same heat resistance as the fifth composition.

As described above, the silicone-modified epoxy resin of the present invention is excellent in heat resistance and useful for coatings applied to hot appliances such as ovens.

While the invention has been shown and described with reference to a certain preferred embodiment thereof, it will be understood by those skilled in the art that various changes in form and details may be made therein without departing from the spirit and scope of the invention as defined by the appended

What is claimed is:

1. A silicone-modified epoxy resin having the following formula

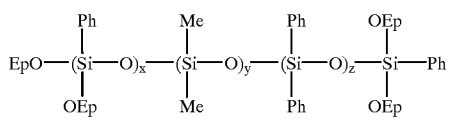

wherein Ep is

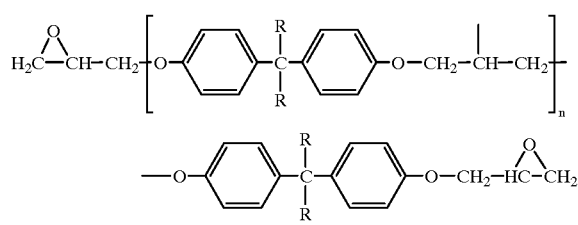

Me is methyl; Ph is phenyl; x, y and z are more than one and n is 1 to 10.

2. A method for preparing a silicone-modified epoxy resin having the following formula

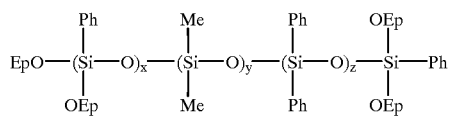

wherein Ep is

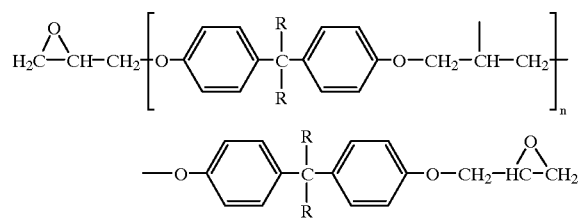

wherein n is 1 to 10 and x, y and z are more than 1 wherein the method comprises the steps of:

(a) heating and melting a bisphenol epoxy resin of the following formula

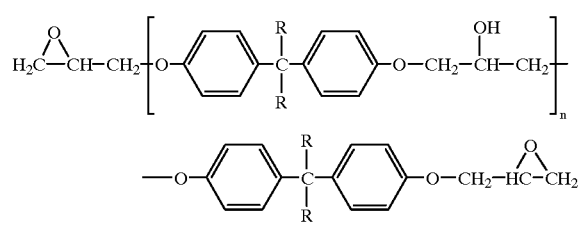

wherein R is —CH$_3$ or H and n is 1 to 10;

(b) mixing the melted bisphenol epoxy resin with a methoxy group silicone intermediate having the following formula

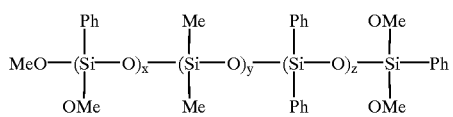

wherein Ph is phenyl, Me is methyl; and x, y, and z are more than 1; and (c) heating the mixture for condensation polymerization.

3. The method of claim 2, wherein in step (a), the bisphenol epoxy resin is heated at a temperature of from 50° C. to 150° C.

4. The method as claimed in claim 2, wherein in step (b), 5–50 wt. % of the methoxy group silicone intermediate is added based on the total weight of the reactant.

5. The method as claimed in claim 2, wherein in step (c), the mixture is heated at 150° C. to 200° C.

6. A powder coating composition comprising a silicone-modified epoxy resin having the following formula

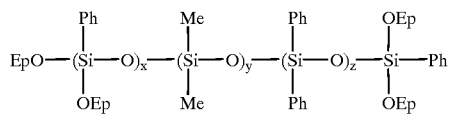

wherein Ep is
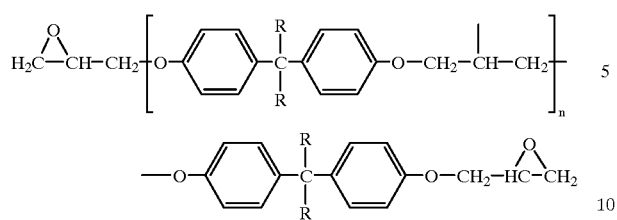
Me is methyl, and Ph is phenyl; x, y and z are more than 1; and n is 1–10;
wherein 5–60 wt % of the silicone-modified epoxy resin is added based on the total weight of the powder coating composition.
* * * * *